(12) United States Patent
Kobayashi et al.

(10) Patent No.: US 12,652,105 B2
(45) Date of Patent: Jun. 9, 2026

(54) ESTIMATION APPARATUS

(71) Applicant: NEC Corporation, Tokyo (JP)

(72) Inventors: Yuji Kobayashi, Tokyo (JP); Jun Kodama, Tokyo (JP); Yoshiaki Sakae, Tokyo (JP); Yasuhiro Ajiro, Tokyo (JP)

(73) Assignee: NEC CORPORATION, Tokyo (JP)

( * ) Notice: Subject to any disclaimer, the term of this patent is extended or adjusted under 35 U.S.C. 154(b) by 264 days.

(21) Appl. No.: 18/539,808

(22) Filed: Dec. 14, 2023

(65) Prior Publication Data

US 2024/0214066 A1 Jun. 27, 2024

(30) Foreign Application Priority Data

Dec. 21, 2022 (JP) ................................. 2022-204265

(51) Int. Cl.
*H04B 10/08* (2006.01)
*H04B 10/079* (2013.01)

(52) U.S. Cl.
CPC ..... *H04B 10/0795* (2013.01); *H04B 10/0793* (2013.01)

(58) Field of Classification Search
CPC ............ H04B 10/0795; H04B 10/0793; H04B 10/07953; H04B 10/0791; H04B 10/0779; H04B 10/0775; H04B 10/2507; H04B 10/0771; H04B 10/07957; H04B 10/07955; H04J 14/02; H04J 14/0227

USPC ........ 398/33, 38, 25, 26, 27, 10, 13, 17, 23, 398/24, 20, 59, 79, 45, 48, 49, 83, 158, 398/159
See application file for complete search history.

(56) References Cited

U.S. PATENT DOCUMENTS

| | | | | |
|---|---|---|---|---|
| 8,571,407 B2 * | 10/2013 | Li | ........................ | H04B 10/65 398/25 |
| 12,395,240 B2 * | 8/2025 | Kuboki | .............. | H04B 10/0791 |
| 2021/0013963 A1 * | 1/2021 | Kuwabara | .......... | H04B 10/0791 |
| 2022/0045900 A1 | 2/2022 | Oda et al. | | |

FOREIGN PATENT DOCUMENTS

| | | |
|---|---|---|
| JP | 65885677 B | 10/2019 |
| JP | 2020-061685 A | 4/2020 |

* cited by examiner

*Primary Examiner* — Hanh Phan

(57) ABSTRACT

An estimation apparatus includes: an acquiring unit that acquires performance information corresponding to the performance of light from nodes configuring an optical network; and an estimating unit that compares the performance information to be an estimation target acquired by the acquiring unit with performance information at normal time at which no anomaly occurs, and performs at least one of estimation of anomaly occurrence and identification of an anomaly occurring node.

9 Claims, 14 Drawing Sheets

COMMUNICATION SYSTEM 110

OPTICAL NETWORK 200

PERFORMANCE INFORMATION

300

COMMUNICATION SYSTEM 100

COMMUNICATION SYSTEM 100

CONSTELLATION WAVEFORM

16QAM

COMMUNICATION SYSTEM 110

ESTIMATION APPARATUS

INCORPORATION BY REFERENCE

This application is based upon and claims the benefit of priority from Japanese patent application No. 2022-204265, filed on Dec. 21, 2022, the disclosure of which is incorporated herein in its entirety by reference.

TECHNICAL FIELD

The present invention relates to an estimation apparatus, an estimation method, and a recording medium.

BACKGROUND ART

A technique used to detect an anomaly occurring in an optical network such as a WDM-NW (Wavelength Division Multiplexing Network) is known.

For example, Patent Literature 1 describes a communication system that has three or more nodes, a failure information transmission apparatus, and a failure location identification apparatus. According to Patent Literature 1, the failure information transmission apparatus is provided for each of the nodes, and transmits failure information indicating that a failure has occurred in a communication path between the node and the other node and that no failure has occurred in a communication path between the node and the other node. Then, the failure location identification apparatus identifies a connection between nodes where a failure has occurred based on the combination of the communication paths where no failure has occurred indicated by the failure information received from the failure information transmission apparatuses provided for the respective nodes.

Further, a related technique is described in, for example, Patent Literature 2. Patent Literature 2 describes a technique for detecting a failure and identifying a failure location based on the result of a connection test using Ping or the like.

Patent Literature 1: Japanese Patent No. 6588567
Patent Literature 2: Japanese Unexamined Patent Application Publication No. JP-A 2020-061685

In the case of the techniques described in Patent Literatures 1 and 2 and the like, a failure is detected after a communication interruption or the like occurs. Therefore, it can be dealt with only after an event with large impact such as a communication interruption occurs, and it is impossible to estimate an anomaly in advance. Thus, there has been a problem that it is difficult to estimate the occurrence of an anomaly that occurs in an optical network.

SUMMARY OF THE INVENTION

Accordingly, an object of the present invention is to provide an estimation apparatus, an estimation method and a recording medium that can solve the abovementioned problem.

In order to achieve the object, an estimation apparatus as an aspect of the present disclosure includes at least one memory configured to store instructions and at least one processor configured to execute the instructions to: acquire performance information corresponding to performance of light from nodes configuring an optical network; and compare the acquired performance information to be an estimation target with performance information at normal time at which no anomaly occurs, and perform at least one of estimation of anomaly occurrence and identification of an anomaly occurring node.

Further, an estimation method as another aspect of the present disclosure is executed by an information processing apparatus, and the estimation method includes: acquiring performance information corresponding to performance of light from nodes configuring an optical network; and comparing the acquired performance information to be an estimation target with performance information at normal time at which no anomaly occurs, and performing at least one of estimation of anomaly occurrence and identification of an anomaly occurring node.

Further, a non-transitory computer-readable recording medium as another aspect of the present disclosure has a program recorded thereon, and the program includes instructions for causing an information processing apparatus to: acquire performance information corresponding to performance of light from nodes configuring an optical network; and compare the acquired performance information to be an estimation target with performance information at normal time at which no anomaly occurs, and perform at least one of estimation of anomaly occurrence and identification of an anomaly occurring node.

With the configurations as described above, it is possible to solve the problem as mentioned above.

EXAMPLE EMBODIMENT

First Example Embodiment

Figure 1:
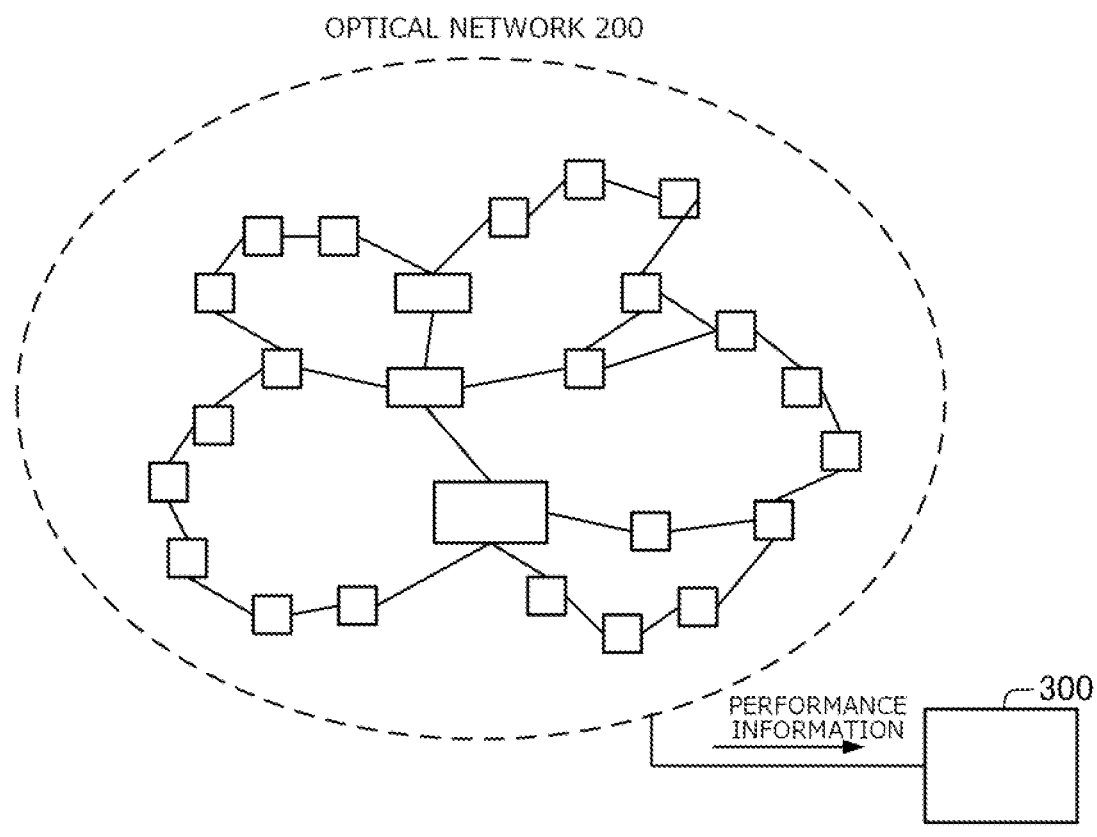
FIG. 1 is a view for describing the overview of a communication system in a first example embodiment of the present disclosure.
Figure 2:
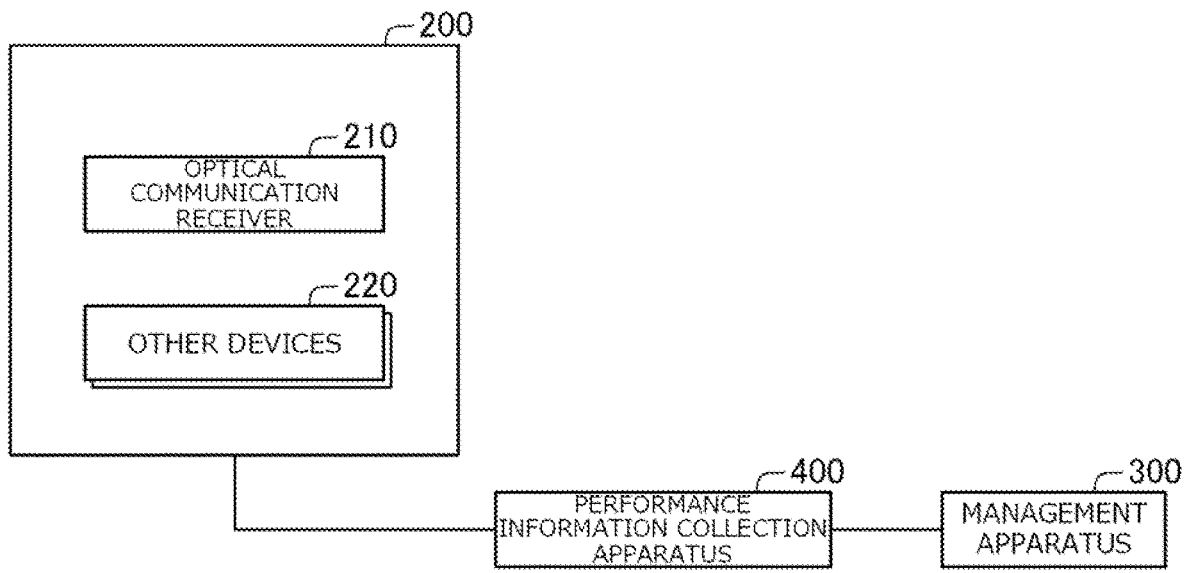
FIG. 2 is a block diagram showing an example of the configuration of the communication system.
Figure 3:
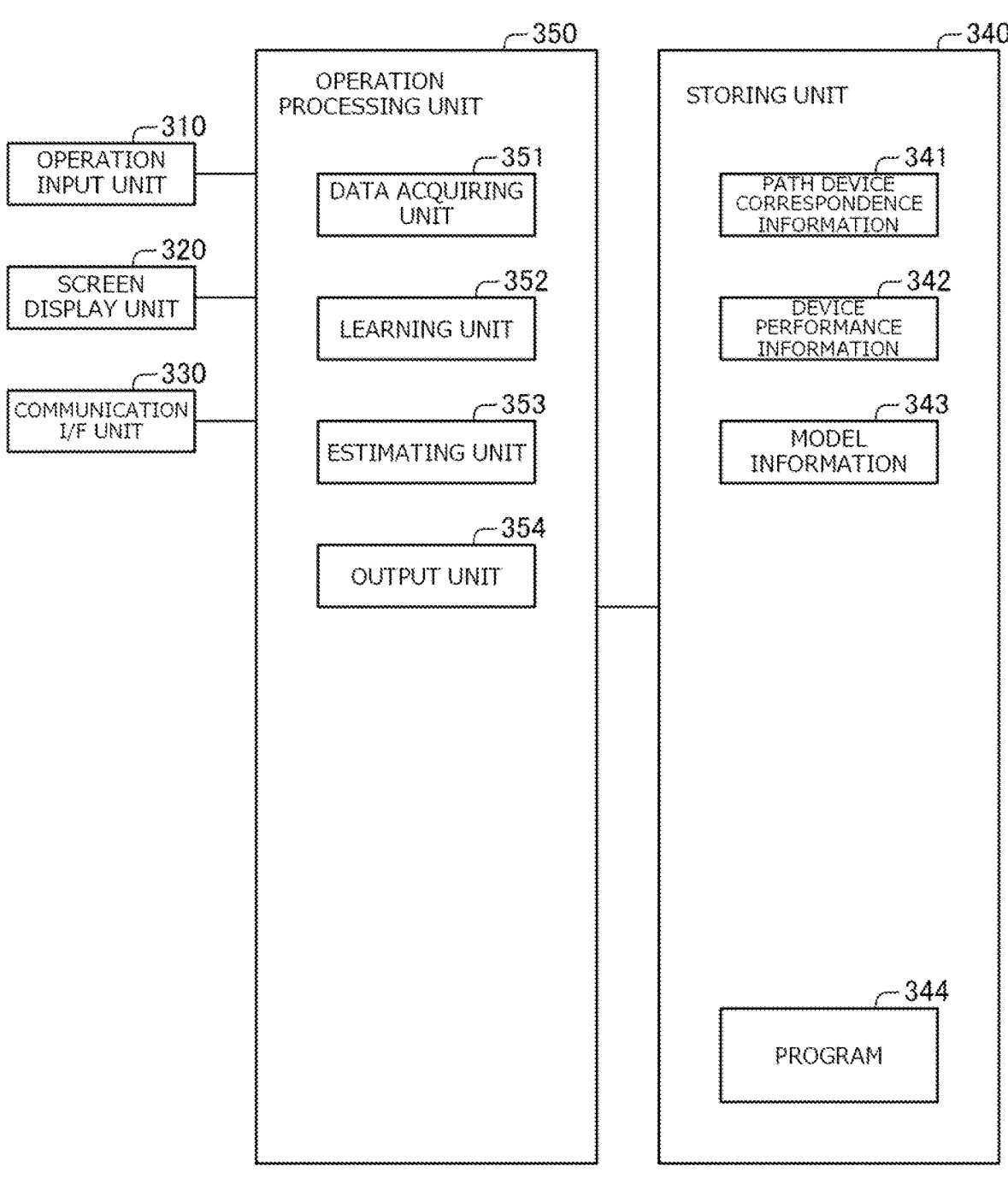
FIG. 3 is a block diagram showing an example of the configuration of a management apparatus.
Figure 4:
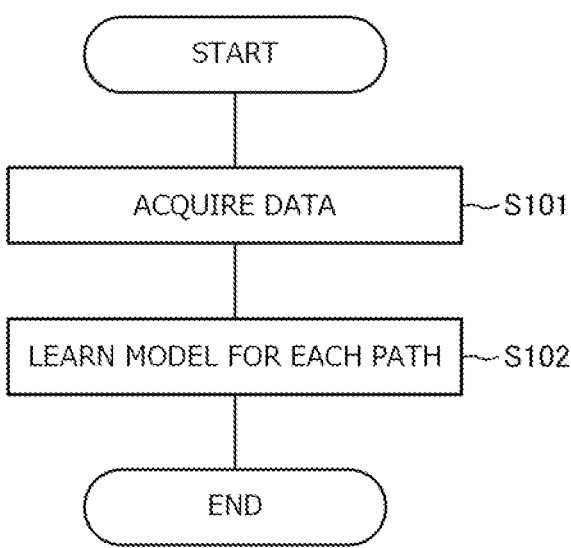
FIG. 4 is a flowchart showing an example of the operation of the management apparatus at the time of learning.
Figure 5:
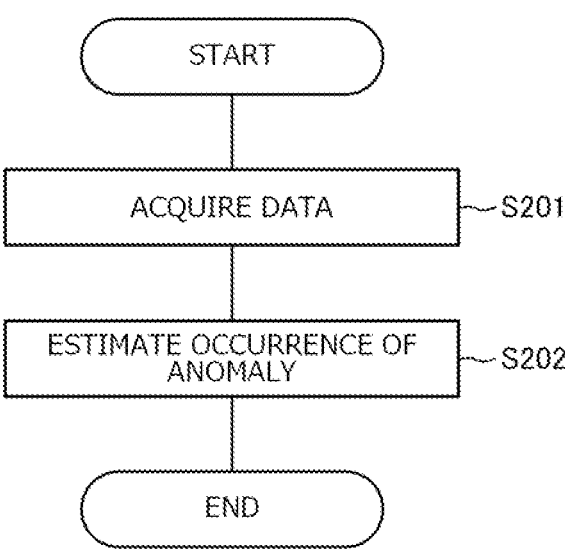
FIG. 5 is a flowchart showing an example of the operation of the management apparatus at the time of estimation.

A first example embodiment of the present disclosure will be described with reference to FIGS. 1 to 5. FIG. 1 is a view for describing the overview of a communication system 100. FIG. 2 is a block diagram showing an example of the configuration of the communication system 100. FIG. 3 is a block diagram showing an example of the configuration of a management apparatus 300. FIGS. 4 and 5 are flowcharts showing an example of the operation of the management apparatus 300.

In the first example embodiment of the present disclosure, as shown in FIG. 1, the management apparatus 300 will be described, which is an estimation apparatus estimating the occurrence of an anomaly in an optical network 200 based on performance information acquired from each node configuring the optical network 200. For example, the management apparatus 300 acquires in advance performance information at normal time that is a state where no anomaly has occurred in each node configuring the optical network 200. Moreover, when acquiring performance information to be an estimation target, the management apparatus 300 directly or indirectly compares the acquired performance information with the performance information at normal time. Then, the management apparatus 300 estimates the occurrence of an anomaly based on the result of the comparison. The management apparatus 300 may also identify a node where the occurrence of an anomaly is estimated in response to identification of performance information with a large difference from the performance information at normal time.

Further, in the case of the present disclosure, the management apparatus 300 can learn a model beforehand based on the performance information at normal time acquired in advance and perform the abovementioned comparison using the learned model. For example, the management apparatus 300 leans a model beforehand so as to output an anomaly value which is a value corresponding to the possibility of the occurrence of an anomaly, the degree of anomaly, and the like, in response to input of performance information. Then, when acquiring performance information to be an estimation target, the management apparatus 300 compares an anomaly value that is an output value when the acquired performance information is input to the model with an anomaly value that is an output value when the performance information at normal time is input to the model, and thereby performs the comparison of the performance information described above. For example, the management apparatus 300 may estimate the occurrence of an anomaly when the difference between the two anomaly values mentioned above is equal to or more than a predetermined value. Meanwhile, the model generated by the management apparatus 300 may be other than illustrated above. For example, the management apparatus 300 may learn a model so as to output, in accordance with input performance information, an anomaly value and also a value indicating the degree of contribution of the input to the anomaly value, and the like. Moreover, the management apparatus 300 may learn a model so as to output information indicating an anomaly occurrence possibility, an anomaly occurrence location, and the like.

In this example embodiment, performance information refers to data corresponding to the performance of communication light measured and acquired by each of the nodes such as a transponder, an amplifier and a switch configuring the optical network 200. For example, performance information includes information corresponding to the state of light itself, such as the intensity of received light and the intensity of transmitted light measured by each device. Performance information may include information corresponding to the state of transmitted data, such as the number of errors and a bit error rate. More specifically, performance information may include at least part of information corresponding to the state of data, such as the number of errors in code operation, the number of errors per second, the number of errors in an error correcting unit, an error occurrence time, an error correction bit rate, a bit error rate, the number of anomaly reception packets, the number of received packets, and the number of received bytes. Moreover, performance information may include at least part of information corresponding to the received light, such as wavelength dispersion, polarization mode dispersion, light intensity, reflected light intensity, optical signal noise ratio, Q value, Raman pump power, Raman pump reflected light intensity, and a span loss value. Moreover, performance information may include at least part of information corresponding to the transmitted light, such as light intensity, light intensity for each wavelength, laser bias current, and the value of loss by an optical attenuator. Performance information may include information other than those shown above, such as the number of switching to a redundant system and a switching time. Performance information to be acquired may differ for each node configuring the optical network 200 or for each type of node.

Using the performance information, it is possible to observe a decrease in the output of the light source, an amplification control fault in the amplifier, a control fault in the optical filter, and the like, that lead to a deterioration in communication quality. Therefore, the management apparatus 300 can estimate the occurrence of an anomaly and identify a node in which an anomaly has occurred by comparing the acquired performance information with the performance information at normal time.

FIG. 2 shows an example of the overall configuration of the communication system 100. Referring to FIG. 2, the communication system 100 has the optical network 200, the management apparatus 300, and a performance information collection apparatus 400. As illustrated in FIG. 2, the performance information collection apparatus 400 is connected to the optical network 200 so as to be able to collect performance information from each of the nodes configuring the optical network 200. Moreover, the performance information collection apparatus 400 and the management apparatus 300 are connected by wire or the like so as to be able to communicate with each other.

The optical network 200 is a network for communication such as a WDM-NW (Wavelength Division Multiplexing Network). Referring to FIG. 2, the optical network 200 includes a plurality of nodes such as an optical communication receiver 210 such as a transponder and other devices 220 such as an amplifier and a switch. For example, in the optical network 200, a plurality of communication paths each passing through a plurality of nodes are set. The respective nodes configuring the optical network 200 can communicate with each other while overlapping communications using a plurality of channels on the set communication paths.

In the case of the present disclosure, the respective nodes such as the optical communication receiver 210 and the other devices 220 configuring the optical network 200 can acquire the abovementioned performance information. In other words, the performance information is acquired by each of the nodes configuring the optical network 200. As described above, the content of the performance information acquired by each of the nodes may vary with the type of the node, or the like. Moreover, the performance information is not limited to the case illustrated above, and may be acquired for each channel, for example.

The management apparatus 300 is an information processing apparatus that functions as an estimation apparatus estimating the occurrence of an anomaly based on performance information acquired from the respective nodes configuring the optical network 200. The management apparatus 300 may also identify a node in which the occurrence of an anomaly is estimated based on the performance information. FIG. 3 shows an example of the configuration of the management apparatus 300. Referring to FIG. 3, the management apparatus 300 has, as major components, for example, an operation input unit 310, a screen display unit 320, a communication I/F unit 330, a storing unit 340, and an operation processing unit 350.

FIG. 3 illustrates a case of realizing the function as the management apparatus 300 by using one information processing apparatus. However, the management apparatus 300 may be realized by using a plurality of information processing apparatuses, for example, may be realized on the cloud. Moreover, the management apparatus 300 may exclude part of the configuration illustrated above, for example, may exclude the operation input unit 310 or the screen display unit 320, or may have a configuration other than that illustrated above.

The operation input unit 310 includes operation input devices such as a keyboard and a mouse. The operation input unit 310 detects an operation by an operator who operates the management apparatus 300, and outputs to the operation processing unit 350.

The screen display unit 320 includes a screen display device such as an LCD (Liquid Crystal Display). The screen display unit 320 can display on a screen a variety of information stored in the storing unit 340 in response to an instruction from the operation processing unit 350.

The communication I/F unit 330 includes a data communication circuit, or the like. The communication I/F unit 330 performs data communication with an external device connected via a communication line.

The storing unit 340 is a storage device such as a hard disk and a memory. The storing unit 340 stores processing information necessary for a variety of processing in the operation processing unit 350 and a program 344. The program 344 implements various processing units by being loaded to and executed by the operation processing unit 350. The program 344 is loaded in advance from an external device or a recording medium via a data input/output function such as the communication I/F unit 330, and is stored in the storing unit 340. Major information stored in the storing unit 340 include, for example, path device correspondence information 341, device performance information 342, and model information 343.

The path device correspondence information 341 shows which node each communication path set in the optical network 200 passes through. For example, in the path device correspondence information 341, the identification information of a communication path is associated with the information of each node through which the communication path passes. For example, the path device correspondence information 341 is acquired in advance by a method such as acquiring from an external device or the like via the communication I/F unit 330 or inputting with the operation input unit 310, and is stored in the storing unit 340.

The device performance information 342 shows performance information acquired in each of the nodes included in the optical network 200. For example, in the device performance information 342, the identification information of a node, information indicating the time of acquisition of performance information, and the performance information are associated. For example, the device performance information 342 is updated in response to acquisition of the performance information and so forth from the performance information collection apparatus 400 and the like via the communication I/F unit 330.

The model information 343 includes information showing a model trained to perform a predetermined output of an anomaly value or the like in response to input of performance information. In other words, the model information 343 includes information showing a model trained to output a value that can be used at the time of estimating the occurrence of an anomaly in the optical network 200. As one example, the model information 343 includes information showing a model trained using performance information at normal time when there is no anomaly in the optical network 200. For example, the model information 343 is updated by a learning unit 352 to be described later performing training based on the performance information at normal time.

In the case of the present disclosure, the model information 343 includes information showing a model for each communication path. In other words, the model information 343 includes, for each communication path, a model trained to perform a predetermined output by inputting the performance information of each of the nodes passed through by the communication path. The model information 343 may include a model other than that illustrated above. For example, the model information 343 may include a model targeted at the entire optical network 200, or may include a model for each node, models for span upstream and downstream nodes, or the like. The model information 343 may include at least some of the models illustrated above.

The operation processing unit 350 has an arithmetic logic unit such as a CPU (Central Processing Unit) and a peripheral circuit thereof. The operation processing unit 350 loads the program 344 from the storing unit 340 and execute the program 344, and thereby makes the abovementioned hardware and the program 344 cooperate with each other and implements various processing units. Major processing units implemented by the operation processing unit 350 include, for example, a data acquiring unit 351, a learning unit 352, an estimating unit 353, and an output unit 354.

Meanwhile, instead of the CPU described above, the operation processing unit 350 may include a GPU (Graphic Processing Unit), a DSP (Digital Signal Processor), an MPU (Micro Processing Unit), an FPU (Floating point number Processing Unit), a PPU (Physics Processing Unit), a TPU (Tensor Processing Unit), a quantum processor, a microcontroller, or a combination thereof.

The data acquiring unit 351 acquires performance information, information indicating the date and time of acquisition of the performance information, and so forth, from the performance information collection apparatus 400. For example, the data acquiring unit 351 acquires the performance information and so forth at given intervals determined in advance such as every 15 minutes. Moreover, the data acquiring unit 351 stores the acquired performance information as the device performance information 342 into the storing unit 340.

For example, the data acquiring unit 351 acquires performance information for model learning from the performance information collection apparatus 400. The data acquiring unit 351 may acquire performance information at normal time as the performance information for model learning. Moreover, the data acquiring unit 351 can acquire performance information to be an anomaly estimation target from the performance information collection apparatus 400.

The learning unit 352 performs machine learning using performance information. For example, the learning unit 352 performs learning using performance information at normal time when it is confirmed that there is no anomaly. Moreover, the learning unit 352 stores a model generated as a result of the learning as the model information 343 into the storing unit 340.

In the case of the present disclosure, the learning unit 352 learns a model for each communication path. For example, the learning unit 352 performs learning using performance information so that an anomaly value or the like is output in response to input of performance information corresponding to each of the nodes passed through by a communication path. The learning unit 352 can learn a model for each communication path by performing the learning as described above for each communication path. Meanwhile, as described above, the learning unit 352 may perform learning to output in response to input of performance information for the entire optical network 200, for each node, or by unit of span.

Meanwhile, the learning unit 352 may perform learning to perform output other than that illustrated above. For example, the learning unit 352 may learn a model to output information indicating the possibility of occurrence of an anomaly, an anomaly occurrence location, or the like in accordance with input performance information.

The estimating unit 353 estimates the occurrence of an anomaly based on performance information to be an estimation target. For example, the estimating unit 353 estimates the occurrence of an anomaly by comparing performance information to be an estimation target with performance information at normal time. As an example, the estimating unit 353 can estimate that an anomaly occurs when the difference between performance information to be an estimation target and performance information at normal time is equal to or more than a predetermined threshold value.

For example, the estimating unit 353 can estimate the occurrence of an anomaly by comparing the performance information of each of the nodes through which a communication path passes. At this time, the estimating unit 353 can perform the comparison of the performance information for each of the nodes through which a communication path passes. Moreover, the estimating unit 353 may perform the comparison by unit of communication path, for example, calculate statistical values based on a plurality of values and compare the calculated statistical values. For example, the estimating unit 353 can estimate that an anomaly occurs when the difference in performance information or the difference in statistical value is equal to or more than a predetermined threshold value. Moreover, the estimating unit 353 may determine, for example, in response to identification of performance information whose difference from the performance information at normal time is the largest or is equal to or more than a threshold value by the comparison for each node, that an anomaly has occurred at a node where the identified performance information is acquired. The estimating unit 353 may compare performance information for the entire optical network 200 or for each node or the like.

Further, the estimating unit 353 may be configured to perform the abovementioned comparison by using a model learned by the learning unit 352. For example, the estimating unit 353 inputs performance information relating to a communication path to be an estimation target to the model, and acquires an output value such as an anomaly value. Then, the estimating unit 353 compares the acquired output value with an output value obtained when performance information at normal time is input to the model. For example, the management apparatus 300 may estimate that an anomaly occurs in a case where the difference between the two output values including the anomaly value described above is equal to or more than a predetermined value. Moreover, the management apparatus 300 may identify a node where the occurrence of an anomaly is estimated in response to identifying performance information with a high anomaly value contribution degree.

The output unit 354 outputs the result of estimation by the estimating unit 353, and the like. For example, the output unit 354 transmits the result of comparison and the like to an external device via the communication I/F unit 330, or causes the screen display unit 320 to display. The output unit 358 may be configured to, when estimating the occurrence of an anomaly, output a fact that an anomaly has been estimated.

The above is an example of the configuration of the management apparatus 300.

The performance information collection apparatus 400 collects performance information from the respective nodes configuring the optical network 200 at predetermined intervals such as every 15 minutes. Moreover, the performance information collection apparatus 400 transmits the collected performance information to the management apparatus 300.

The performance information collection apparatus 400 may be an information processing apparatus that has an arithmetic logic unit such as a CPU and a memory unit. For example, the performance information collection apparatus 400 can realize the abovementioned processing by execution of a program stored in the memory unit by the arithmetic logic unit.

The above is an example of the respective configurations included by the communication system 100. Subsequently, an example of the operation of the management apparatus 300 will be described with reference to FIGS. 4 and 5.

FIG. 4 is a flowchart showing an example of the operation of the management apparatus 300 at the time of model learning. Referring to FIG. 4, the data acquiring unit 351 acquires performance information and so forth from the performance information collection apparatus 400 (step S101). For example, the data acquiring unit 351 acquires performance information at normal time as performance information for model learning.

The learning unit 352 performs machine learning using performance information (step S102). For example, the learning unit 352 learns a model for each communication path, using performance information at normal time when it is confirmed that there is no anomaly.

The above is an example of the operation of the management apparatus 300 at the time of model learning. Subsequently, an example of the operation of the management apparatus 300 at the time of anomaly estimation will be described with reference to FIG. 5.

FIG. 5 is a flowchart showing an example of the operation of the management apparatus 300 at the time of anomaly estimation. Referring to FIG. 5, the data acquiring unit 351 acquires performance information and so forth from the performance information collection apparatus 400 (step S201).

The estimating unit 353 estimates the occurrence of an anomaly based on performance information to be an estimation target (step S202). For example, the estimating unit 353 estimates the occurrence of an anomaly by comparing performance information to be an estimation target with performance information at normal time. The estimating unit 353 may perform the abovementioned comparison by using a model learned by the learning unit 352.

The above is an example of the operation of the management apparatus 300 at the time of anomaly estimation.

Thus, the management apparatus 300 has the estimating unit 353. With such a configuration, the estimating unit 353 can estimate the occurrence of an anomaly based on performance information to be an estimation target. As a result, before an event with large impact such as a communication interruption occurs, the occurrence of an anomaly can be estimated. Moreover, with the above configuration, the estimating unit 353 estimates the occurrence of an anomaly by comparing performance information to be an estimation target with performance information at normal time. By estimating the occurrence of an anomaly by the comparison with normal time, it is possible to perform estimation corresponding to the status of a communication path and the status of a node through which the communication path passes.

In the present disclosure, the estimating unit 353 can perform at least one of the comparisons by unit of communication path, by unit of optical network 200, by unit of node, and by unit of span. For example, in a case where the comparison is performed by unit of optical network 200, the number of models to be managed is 1, and the cost of model maintenance is small. On the other hand, in the above case, there is a disadvantage that the model needs to be updated every time even one node or communication path in the optical network 200 changes. In a case where a model is generated by unit of node, even if one of the nodes or communication paths in the optical network 200 changes, a model to be updated is only a model corresponding to the changed node. On the other hand, the number of models to be managed corresponds to the number of nodes, and the maintenance cost is high. Thus, the comparisons by the estimating unit 353 have advantages and disadvantages, respectively. Therefore, it is desirable that a method of the comparison by the estimating unit 353 is selected appropriately in accordance with the situation at that time, and the like.

Further, the present disclosure has illustrated the case where the communication system 100 has the management apparatus 300 outside the optical network 200. However, the function as the management apparatus 300 may be included by at least any of the nodes included in the optical network 200. In a case where the node included in the optical network 200 has the function as the management apparatus 300, the communication system 100 does not need to have the management apparatus 300.

Further, in a case where the estimating unit 353 directly compares performance information with each other, the management apparatus 300 does not need to have the learning unit 352. Thus, the management apparatus 300 may include at least part of the configuration illustrated in the present disclosure.

Second Example Embodiment

Figure 6:
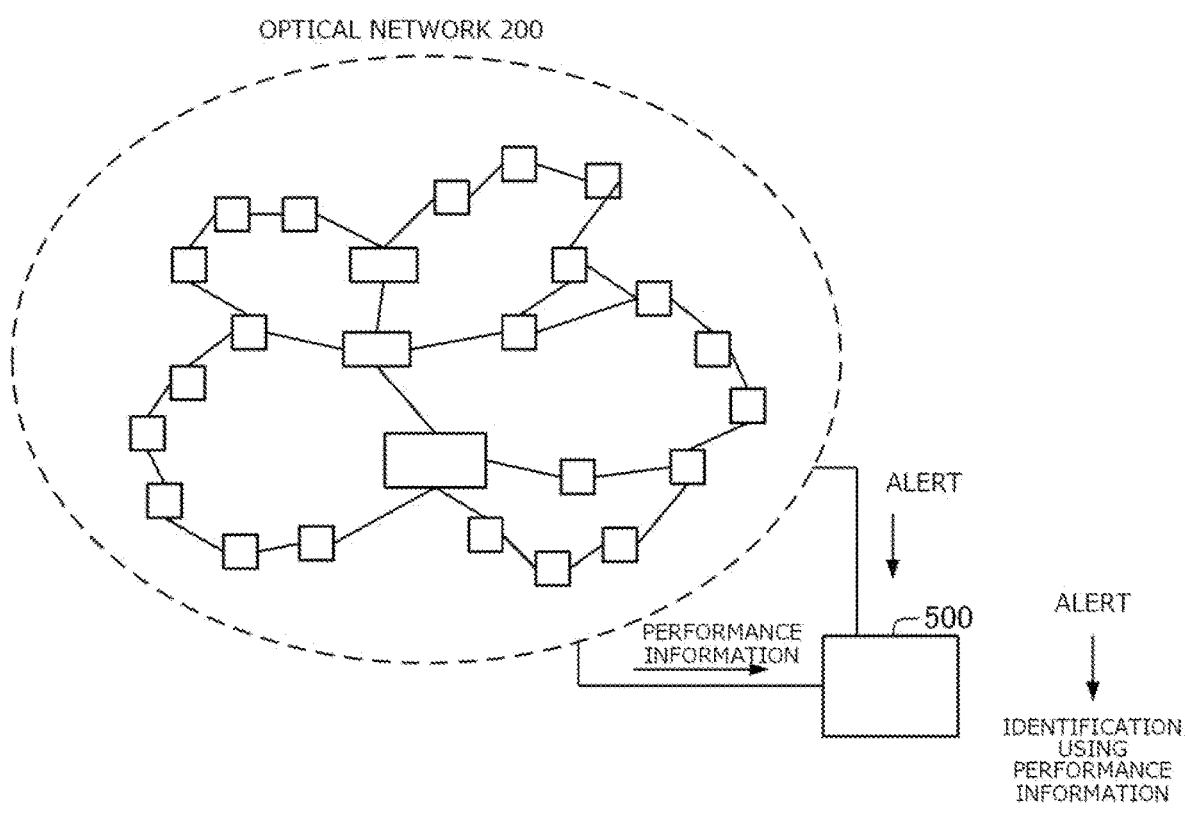
FIG. 6 is a view for describing the overview of a communication system in a second example embodiment of the present disclosure.
Figure 7:
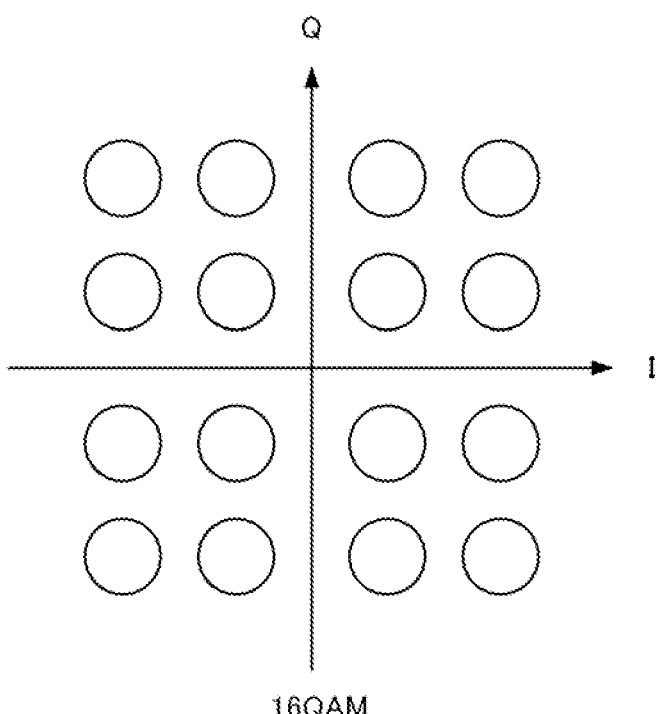
FIG. 7 is a view for describing an example of signal information.
Figure 8:
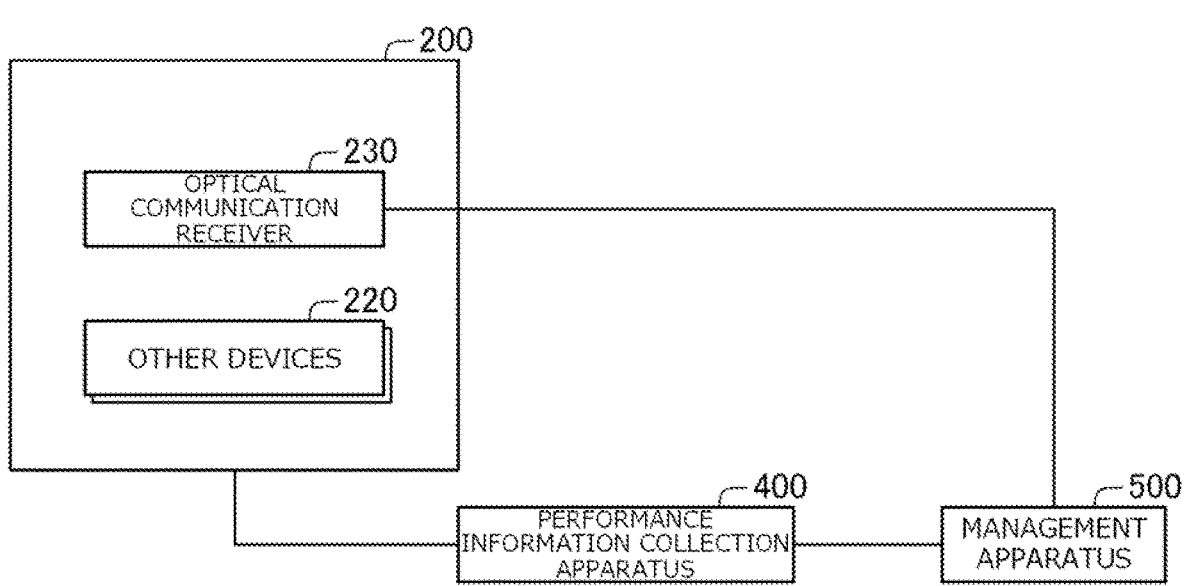
FIG. 8 is a block diagram showing an example of the configuration of the communication system.
Figure 9:
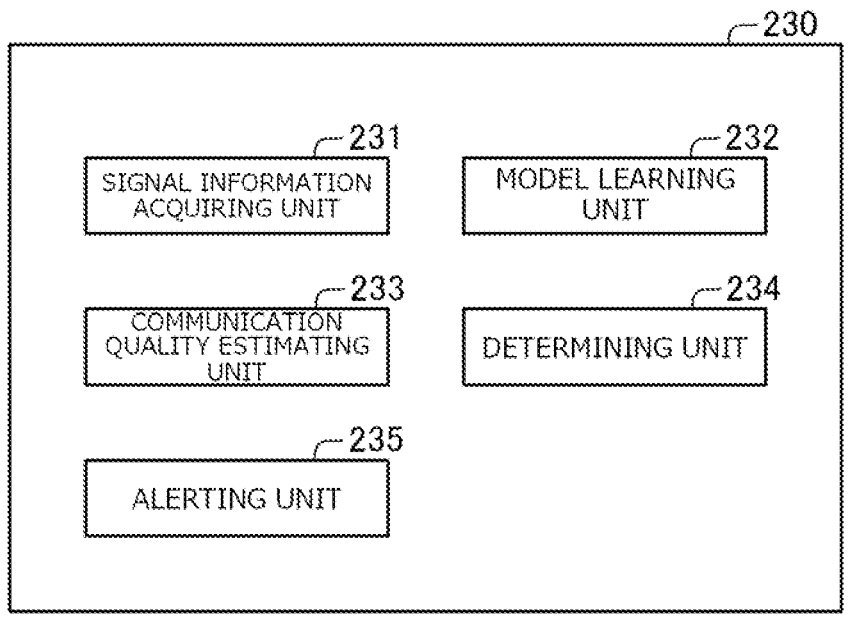
FIG. 9 is a block diagram showing an example of the configuration of an optical communication receiver.
Figure 10:
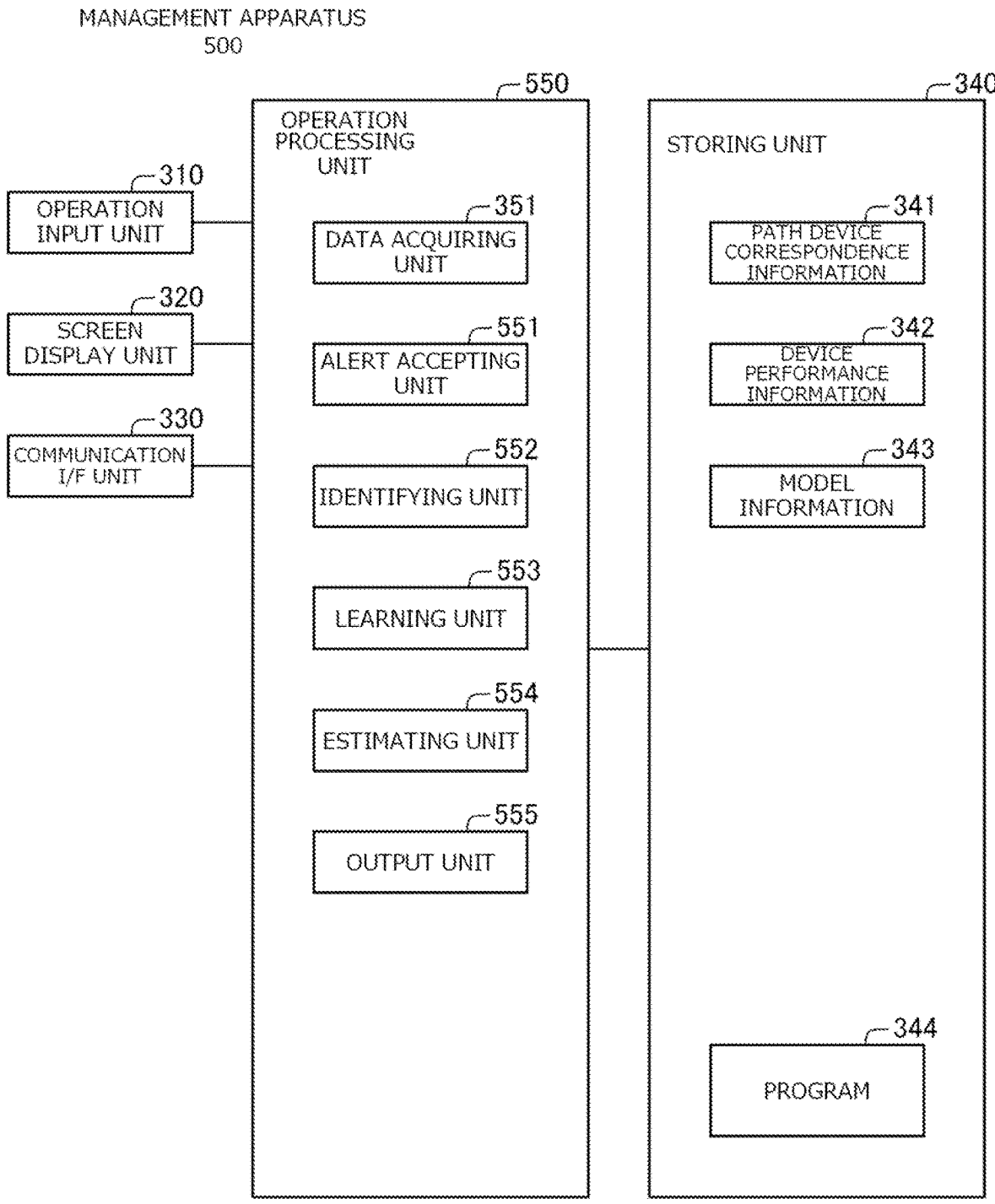
FIG. 10 is a block diagram showing an example of the configuration of a management apparatus.
Figure 11:
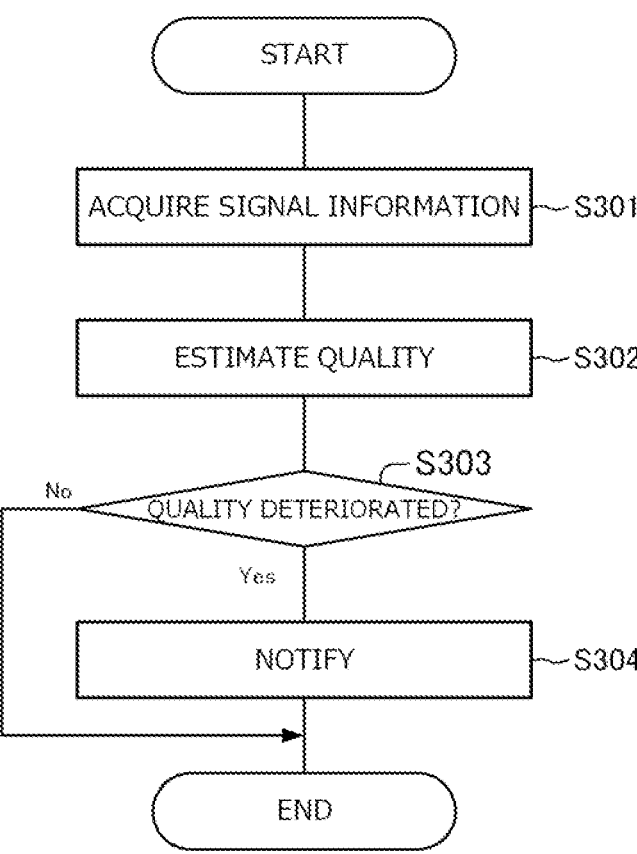
FIG. 11 is a flowchart showing an example of the operation of the optical communication receiver.
Figure 12:
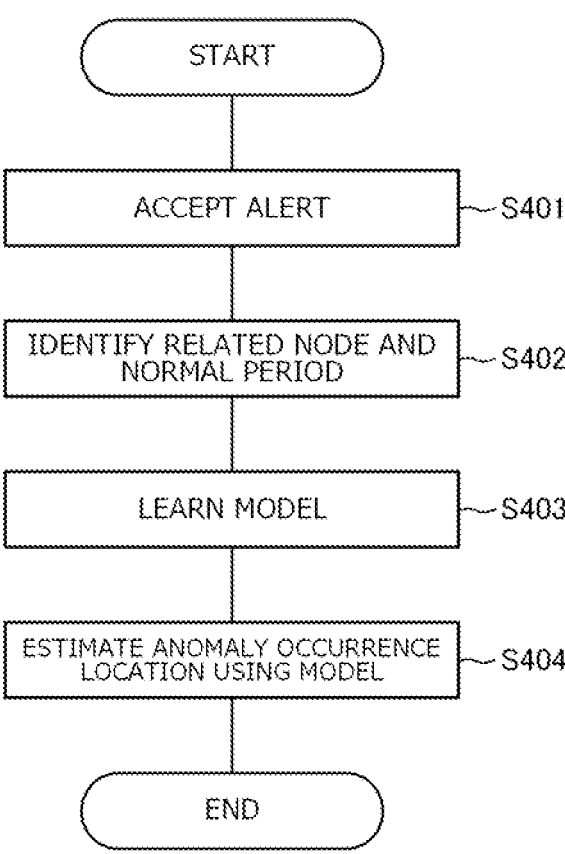
FIG. 12 is a flowchart showing an example of the operation of the management apparatus.

Next, a second example embodiment of the present disclosure will be described with reference to FIGS. 6 to 12. FIG. 6 is a view for describing the overview of a communication system 110. FIG. 7 is a view for describing an example of signal information. FIG. 8 is a block diagram showing an example of the configuration of the communication system 110. FIG. 9 is a block diagram showing an example of the configuration of an optical communication receiver 230. FIG. 10 is a block diagram showing an example of the configuration of a management apparatus 500. FIG. 11 is a flowchart showing an example of the operation of the optical communication receiver 230. FIG. 12 is a flowchart showing an example of the operation of the management apparatus 500.

The second example embodiment of the present disclosure describes the communication system 110 that identifies, with an alert based on signal information as a trigger, a node in which the occurrence of an anomaly is estimated based on performance information as shown in FIG. 6. For example, the communication system 110 estimates the occurrence of an anomaly by monitoring signal information. Then, in a case where the occurrence of an anomaly is estimated, the communication system 110 alerts the management apparatus 500. When accepting an alert, the management apparatus 500 performs the comparison of performance information as in the first example embodiment, and identifies a node in which the occurrence of an anomaly is estimated. For example, in this example embodiment, the management apparatus 500 stores acquired performance information until accepting an alert. Then, when accepting an alert, the management apparatus 500 identifies performance information at normal time based on the time of the alert, or the like. After that, the management apparatus 500 performs learning based on the identified performance information at normal time, and performs the comparison of performance information. Thus, the management apparatus 500 described in this example embodiment can identify performance information at normal time in response to an alert or the like, and perform learning using the identified performance information.

In the present disclosure, signal information refers to data representing a symbol (1 channel) of optical digital coherent communication received by the optical communication receiver 230 serving as the receiving end as coordinates on the IQ plane, for example, as illustrated in FIG. 7. Signal information is information corresponding to the amplitude and phase difference of light, and can also be called a constellation waveform. For example, in a constellation waveform, the distance and direction (angle formed with the I-axis) from the origin correspond to the amplitude and phase difference of light, respectively, and predetermined coordinates specified for each modulation system represent the content of the signal. The effects of noise and fault event, which are factors of deterioration of the quality, appear as deviations and distortions from the predetermined coordinates. Therefore, by comparing the signal information, it is possible to estimate the occurrence of an anomaly in a communication path.

For example, the signal information is acquired for each channel or for each communication path by the optical communication receiver 230 or the like. The optical communication receiver 230 serving as the receiving end can acquire the signal information at predetermined intervals, for example, every second. Meanwhile, the signal information is not limited to the case illustrated in FIG. 7, and may be the one corresponding to a communication system, such as QPSK (quadrature phase-shift keying) or 16QAM (quadrature amplitude modulation).

FIG. 8 shows an example of the overall configuration of the communication system 110. Referring to FIG. 8, the communication system 110 has the optical network 200, the management apparatus 500, and the performance information collection apparatus 400. As illustrated in FIG. 8, the performance information collection apparatus 400 is connected to the optical network 200 so as to be able to collect performance information from the respective nodes configuring the optical network 200. The performance information collection apparatus 400 and the management apparatus 500 are connected by wire or the like so as to be able to communicate with each other. The management apparatus 500 is connected to at least the optical communication receiver 230 serving as the receiving end of a communication path so as to be able to receive an alert.

Referring to FIG. 8, the optical network 200 of the present disclosure includes the optical communication receiver 230, instead of the optical communication receiver 210 described in the first example embodiment. The optical network 200 may include the optical communication receiver 210 along with the optical communication receiver 230.

The optical communication receiver 230 is an information processing apparatus that acquires signal information and, when the acquired signal information satisfies a predetermined condition, alerts the management apparatus 500. Moreover, the optical communication receiver 230 can acquire, in addition to the abovementioned signal information, the performance information described in the first example embodiment.

FIG. 9 shows an example of the configuration of the optical communication receiver 230 characteristic of this example embodiment. For example, referring to FIG. 9, the optical communication receiver 230 has a signal information acquiring unit 231, a model learning unit 232, a communication quality estimating unit 233, a determining unit 234, and an alerting unit 235. For example, the optical communication receiver 230 has an arithmetic logic unit such as a CPU and a memory unit. The optical communication receiver 230 can implement the respective processing units described above by execution of a program stored in the memory unit by the arithmetic logic unit.

The signal information acquiring unit 231 acquires signal information as illustrated in FIG. 7. Moreover, the signal information acquiring unit 231 can store the acquired signal information into the memory unit or the like. For example, the signal information acquiring unit 231 can acquire signal information at predetermined intervals, for example, every second.

For example, the signal information acquiring unit 231 can acquire signal information at normal time as signal information for model learning. The signal information acquiring unit 231 can also acquire signal information to be an anomaly estimation target.

The model learning unit 232 performs machine learning using signal information. For example, the model learning unit 232 performs learning using signal information at normal time in which it is confirmed that no anomaly has occurred. Specifically, the model learning unit 232 performs learning using signal information so as to output a quality value corresponding to the quality of signal in response to input of signal information. Moreover, the model learning unit 232 can store information showing the learned model into the memory unit or the like.

The model learning unit 232 may perform learning at any timing. For example, the model learning unit 232 may be configured to learn a model in response to a configuration change such as a change in a communication path or a change in a node through which a communication path passes. Detection of a configuration change may be realized by any method. Moreover, the model learning unit 232 may learn a model at timing other than that illustrated above.

The communication quality estimating unit 233 estimates a quality value based on signal information to be an estimation target. For example, the communication quality estimating unit 233 inputs signal information to be an estimation target to a model learned by the model learning unit 232, and thereby acquires a quality value that is an output from the model.

The determining unit 234 estimates the occurrence of an anomaly based on the quality value estimated by the communication quality estimating unit 233. For example, the determining unit 234 compares the quality value estimated by the communication quality estimating unit 233 with a quality value obtained by inputting signal information at normal time to the model. Then, the determining unit 234 estimates the occurrence of an anomaly based on the result of the comparison. For example, the determining unit 234 can estimate the occurrence of an anomaly when the difference between the two quality values described above is equal to or more than a predetermined value. Moreover, the determining unit 234 may identify the time when the occurrence of an anomaly is estimated based on the time of acquisition of the signal information used for acquiring the quality value, or the like. The determining unit 234 may identify a channel or a communication path where the occurrence of an anomaly is estimated based on the signal information used for acquiring the quality value, or the like.

The determining unit 234 may estimate the occurrence of an anomaly by comparing the quality value estimated by the communication quality estimating unit 233 with a predetermined threshold value. For example, the determining unit 234 can estimate the occurrence of an anomaly in a case where the quality value estimated by the communication quality estimating unit 233 is equal to or less than the predetermined threshold value.

The alerting unit 235 alerts the management apparatus 500 to a fact that the occurrence of an anomaly is estimated, in response to the estimation of the occurrence of an anomaly by the determining unit 234. The alerting unit 235 may give an alert including information showing a channel or a communication path where an anomaly is estimated, the time when the occurrence of an anomaly is estimated, and the like.

The above is an example of the configuration of the optical communication receiver 230.

The management apparatus 500 is an information processing apparatus that identifies a node where the occurrence of an anomaly is estimated based on performance information. The management apparatus 500 may identify a node where the occurrence of an anomaly is estimated based on performance information by the same method as in the first example embodiment.

FIG. 10 shows an example of the configuration of the management apparatus 500. Referring to FIG. 10, the management apparatus 500 has the operation input unit 310, the screen display unit 320, the communication I/F unit 330, the storing unit 340, and an operation processing unit 550, as major components, for example.

FIG. 10 illustrates a case of realizing a function as the management apparatus 500 by using one information processing apparatus. However, the management apparatus 500 may be realized using a plurality of information processing apparatuses, for example, may be realized on the cloud, as in the management apparatus 300 described in the first example embodiment. Moreover, the management apparatus 500 may exclude part of the configuration illustrated above, for example, may exclude the operation input unit 310 or the screen display unit 320, or may have a configuration other than that illustrated above. Below, a configuration characteristic of this example embodiment will be described.

An alert accepting unit 551 accepts an alert from the optical communication receiver 230. The alert accepting unit 551 may receive an alert including information indicating a channel or a communication path where an anomaly is estimated and the time when the occurrence of an anomaly is estimated.

The identifying unit 552 performs identification corresponding to the alert accepted by the alert accepting unit 551.

For example, the identifying unit 552 identifies a node passed through by a channel or a communication path where the occurrence of an anomaly is estimated, in response to an alert accepted by the alert accepting unit 551, and so forth. The identifying unit 552 may identify a node passed through by a channel or a communication path where the occurrence of an anomaly is estimated, by referring to the path device correspondence information 341. Moreover, the identifying unit 552 identifies performance information satisfying a predetermined condition among the performance information included by the device performance information 342, based on the result of identification of the node, the time when the occurrence of an anomaly is estimated, and so forth. For example, the identifying unit 552 identifies performance information acquired at normal time among the performance information of the identified node included by the device performance information 342. For example, the identifying unit 552 can identify performance information acquired before the time indicated by the alert among the performance information included by the device performance information 342, as performance information acquired at normal time. The identifying unit 552 may identify performance information acquired a given time before the time included by the alert among the performance information included by the device performance information 342, as performance information acquired at normal time.

Further, the identifying unit 552 may be configured to, in a case where a configuration change such as a change in a communication path and a change in a node passed through by a communication path has been conducted, identify only performance information after the configuration change among the performance information included by the device performance information 342. In other words, the identifying unit 552 may be configured to identify performance information at normal time after the configuration change, based on the alert and so forth.

The learning unit 553 performs learning using the performance information at normal time identified by the identifying unit 552. Moreover, the learning unit 553 stores a model generated as a result of the learning as the model information 343 into the storing unit 340.

For example, the learning unit 553 learns a model corresponding to a communication path where the occurrence of an anomaly is estimated, by using the performance information at normal time identified by the identifying unit 552. The learning unit 553 may perform the learning using performance information so as to output an anomaly value or the like in response to input of performance information corresponding to each node passed through by a communication path, in the same manner as the learning unit 352 described in the first example embodiment.

The estimating unit 554 identifies a node in which the occurrence of an anomaly is estimated based on performance information to be an estimation target.

For example, the estimating unit 554 identifies a node in which the occurrence of an anomaly is estimated by comparing the performance information to be an estimation target acquired after the time indicated by the alert with the performance information at normal time identified by the identifying unit 552. As in the first example embodiment, in response to identifying performance information such that the difference between the performance information to be an estimation target and the performance information at normal time is the largest or is equal to or more than a predetermined threshold value, the estimating unit 554 may identify that an anomaly has occurred in a node from which the identified performance information has been acquired.

Further, as in the first example embodiment, by using the model learned by the learning unit 553, the estimating unit 554 may perform the abovementioned comparison and identify a node in which the occurrence of an anomaly is estimated.

The output unit 555 outputs the result of estimation by the estimating unit 554, and so forth. For example, the output unit 555 transmits the result of comparison and so forth to an external device via the communication I/F unit 330, or causes the screen display unit 320 to display. The output unit 555 may be configured to, when the occurrence of an anomaly is estimated, output a fact that an anomaly is estimated.

The above is an example of the configuration of the management apparatus 500.

Subsequently, an example of the operation of the optical communication receiver 230 will be described with reference to FIG. 11, and an example of the operation of the management apparatus 500 will be described with reference to FIG. 12.

FIG. 11 is a flowchart showing an example of the operation of the optical communication receiver 230. Referring to FIG. 11, the signal information acquiring unit 231 acquires signal information (step S301). For example, the signal information acquiring unit 231 can acquire signal information at predetermined intervals, for example, every second.

The communication quality estimating unit 233 estimates a quality value based on signal information to be an estimation target (step S302). For example, the communication quality estimating unit 233 inputs signal information to be an estimation target to a model learned by the model learning unit 232, and acquires a quality value that is an output from the model.

The determining unit 234 checks whether or not the quality is deteriorated based on the quality value estimated by the communication quality estimating unit 233, and estimates the occurrence of an anomaly (step S303).

For example, in a case where the difference between the quality value estimated by the communication quality estimating unit 233 and a quality value obtained by inputting signal information at normal time to the model is equal to or more than a predetermined value, the determining unit 234 determines that the quality is deteriorated (step S303, Yes). In response to this, the alerting unit 235 alerts the management apparatus 500 (step S304). The alerting unit 235 may give an alert including information indicating a channel or a communication path where an anomaly is estimated and the time when the occurrence of an anomaly is estimated.

On the other hand, in a case where the difference between the quality value estimated by the communication quality estimating unit 233 and a quality value obtained by inputting signal information at normal time to the model is less than the predetermined value, the determining unit 234 determines that the quality is not deteriorated (step S303, No). In this case, the alerting unit 235 does not alert.

The above is an example of the operation of the optical communication receiver 230. Subsequently, an example of the operation of the management apparatus 500 will be described with reference to FIG. 12.

FIG. 12 is a flowchart showing an example of the operation of the management apparatus 500. Referring to FIG. 12, the alert accepting unit 551 accepts an alert from the optical communication receiver 230 (step S401). The alert accepting unit 551 may receive an alert including information indicating a channel or a communication path where an anomaly is estimated and the time when the occurrence of an anomaly is estimated.

The identifying unit 552 performs identification responsive to the alert and the like accepted by the alert accepting unit 551 (step S402). For example, the identifying unit 552 identifies a node passed through by the channel or the communication path where the occurrence of an anomaly is estimated, in response to the alert accepted by the alert accepting unit 551. Moreover, the identifying unit 552 identifies performance information satisfying a predetermined condition among the performance information included by the device performance information 342, based on the result of identification of node, the time when the occurrence of an anomaly is estimated, and so forth. For example, the identifying unit 552 identifies performance information acquired at normal time among the performance information of the identified node included by the device performance information 342.

The learning unit 553 performs learning using the performance information at normal time identified by the identifying unit 552 (step S403). For example, the learning unit 553 learns a model corresponding to the communication path where the occurrence of an anomaly is estimated, by using the performance information at normal time identified by the identifying unit 552.

The estimating unit 554 identifies a node where the occurrence of an anomaly is estimated based on performance information to be an estimation target (step S404). For example, the estimating unit 554 compares performance information to be an estimation target acquired after the time indicated by the alert with the performance information at normal time identified by the identifying unit 552, and identifies a node where the occurrence of an anomaly is estimated. The estimating unit 554 may perform the comparison by using the model learned by the learning unit 553.

The above is an example of the operation of the management apparatus 500.

Thus, the management apparatus 500 has the alert accepting unit 551, the identifying unit 552, the learning unit 553, and the estimating unit 554. With such a configuration, the identifying unit 552 can identify performance information at normal time and so forth in response to an alert accepted by the alert accepting unit 551. As a result, the learning unit 553 can perform learning based on the performance information at normal time identified by the identifying unit 552. Consequently, the estimating unit 554 can perform the comparison using the model learned by the learning unit 553.

In general, the frequency of acquiring signal information is higher than the frequency of acquiring performance information. Therefore, by using an alert based on signal information as a trigger, the occurrence of an anomaly can be estimated more quickly. Moreover, by identifying performance information at normal time by using an alert based on signal information as a trigger, more appropriate identification is enabled.

Further, by the method illustrated in the present disclosure, the management apparatus 500 can perform learning based on performance information identified in response to an alert. As a result, without determining normal time or the like in advance, and without managing a model learned in advance, the management apparatus 500 can estimate the occurrence of an anomaly by appropriately using a model.

In this example embodiment, the case where the optical communication receiver 230 alerts based on signal information has been illustrated. However, a node or an information processing apparatus other than the optical communication receiver 230 may alert based on signal information. For example, the management apparatus 500 or the like may be configured to determine the quality based on signal information or the like from the optical communication receiver 230. In other words, along with or instead of the optical communication receiver 230, the management apparatus 500 may have each function of the optical communication receiver 230 described with reference to FIG. 9.

Third Example Embodiment

Figure 13:
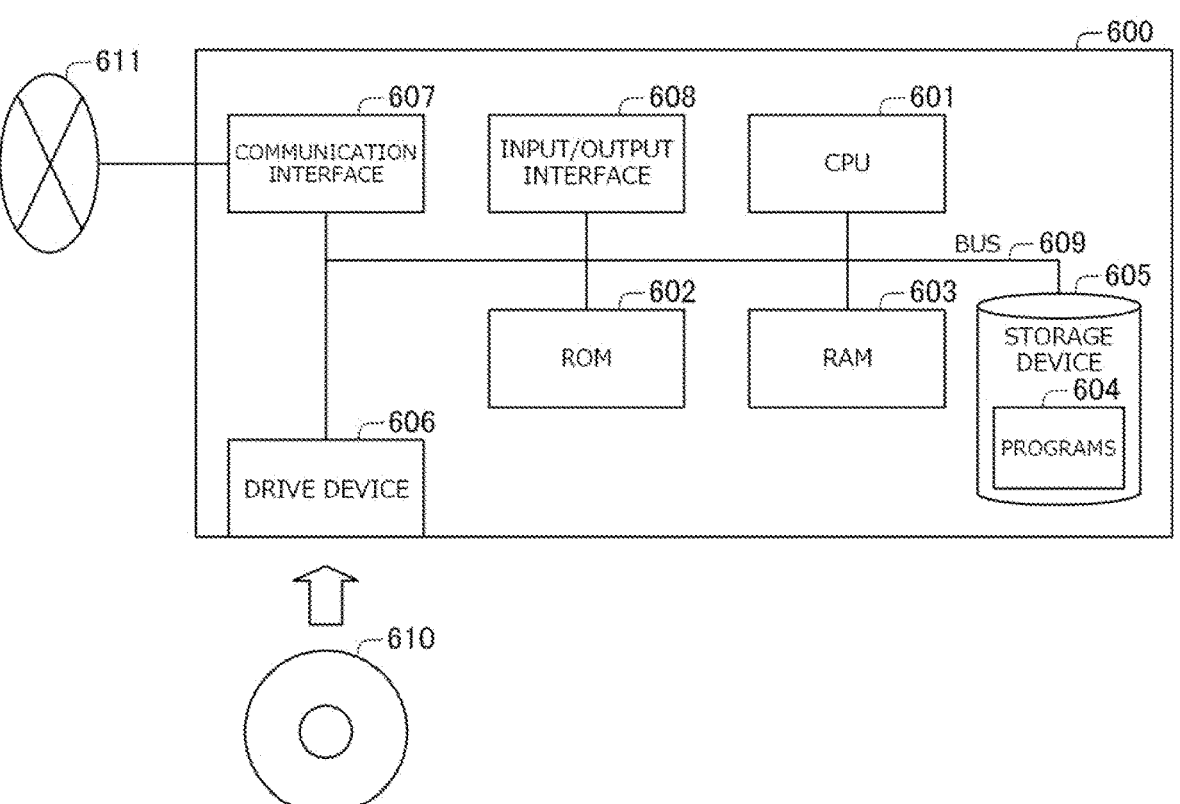
FIG. 13 is a view showing an example of the hardware configuration of an estimation apparatus in a third example embodiment of the present disclosure.
Figure 14:
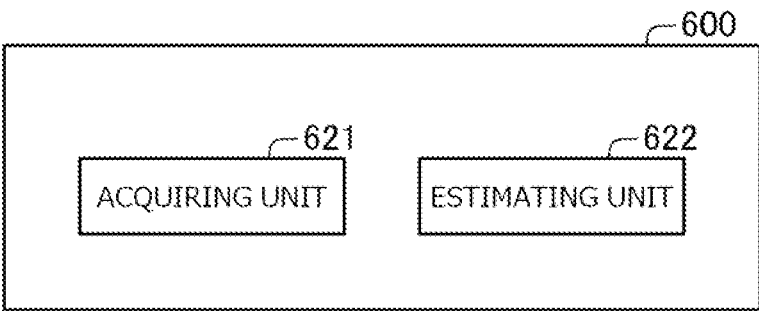
FIG. 14 is a block diagram showing an example of the configuration of the estimation apparatus.

Next, a third example embodiment of the present disclosure will be described with reference to FIGS. 13 and 14. FIG. 13 is a view showing an example of the hardware configuration of an estimation apparatus 600. FIG. 14 is a block diagram showing an example of the configuration of the estimation apparatus 600.

In the third example embodiment of the present disclosure, the estimation apparatus 600 will be described, which is an information processing apparatus that estimates the occurrence of an anomaly in an optical network based on performance information. FIG. 13 shows an example of the hardware configuration of the estimation apparatus 600. Referring to FIG. 13, as an example, the estimation apparatus 600 has a hardware configuration as described below including:

a CPU (Central Processing Unit) 601 (arithmetic logic unit);

a ROM (Read Only Memory) 602 (memory unit);

a RAM (Random Access Memory) 603 (memory unit);

programs 604 loaded to the RAM 603;

a storage device 605 storing the programs 604;

a drive device 606 reading from and writing into a recording medium 610 outside the information processing apparatus;

a communication interface 607 connected to a communication network 611 outside the information processing apparatus;

an input/output interface 608 performing input/output of data; and a bus 609 connecting the respective components.

Further, the estimation apparatus 600 can implement functions as an acquiring unit 621 and an estimating unit 622 shown in FIG. 14 by acquisition and execution of the programs 604 by the CPU 601. The programs 604 are, for example, stored in the storage device 605 or the ROM 602 in advance, and is loaded to the RAM 603 or the like and executed by the CPU 601 as necessary. Moreover, the programs 604 may be delivered to the CPU 601 via the communication network 611, or may be stored in the recording medium 610 in advance and retrieved and delivered to the CPU 601 by the drive device 606.

FIG. 13 shows an example of the hardware configuration of the estimation apparatus 600. The hardware configuration of the estimation apparatus 600 is not limited to the above case. For example, the estimation apparatus 600 may be configured by part of the above configuration, for example, may exclude the drive device 606. Moreover, the CPU 601 may be a GPU or the like illustrated in the first example embodiment.

The acquiring unit 621 acquires performance information corresponding to the performance of light from a node configuring an optical network.

The estimating unit 622 compares the performance information to be an estimation target acquired by the acquiring unit 621 with performance information at normal time when no anomaly has occurred, and performs at least one of estimation of the occurrence of an anomaly and identification of a node where an anomaly occurs.

Thus, the estimation apparatus 600 has the acquiring unit 621 and the estimating unit 622. With such a configuration, the estimating unit 622 can compare the performance information to be an estimation target acquired by the acquiring unit 621 with performance information at normal time when no anomaly has occurred, and perform at least one of estimation of the occurrence of an anomaly and identification of a node where an anomaly occurs. As a result, it is possible to estimate the occurrence of an anomaly occurring in the optical network before an event with large impact such as a communication interrupt occurs.

The estimation apparatus 600 described above can be realized by installation of a predetermined program in an information processing apparatus such as the estimation apparatus 600. Specifically, a program as another aspect of the present invention is a program for causing an information processing apparatus such as the estimation apparatus 600 to realize processes to acquire performance information corresponding to the performance of light from a node configuring an optical network, and compare the acquired performance information to be an estimation target with performance information at normal time when no anomaly occurs and perform at least one of estimation of the occurrence of an anomaly and identification of a node where an anomaly occurs.

Further, a processing method executed by an information processing apparatus such as the estimation apparatus 600 described above is a method including acquiring performance information corresponding to the performance of light from a node configuring an optical network, and comparing the acquired performance information to be an estimation target with performance information at normal time when no anomaly occurs and performing at least one of estimation of the occurrence of an anomaly and identification of a node where an anomaly occurs.

The inventions of the program, the computer-readable recording medium having a program recorded thereon, and the estimation method having the abovementioned configurations have the same actions and effects as the estimation apparatus 600 described above, and therefore, can achieve the object of the present disclosure described above.

SUPPLEMENTARY NOTES

The whole or part of the example embodiments disclosed above can be described as the following supplementary notes. Below, the overview of an estimation apparatus and the like according to the present invention will be described. However, the present invention is not limited to the following configurations.

Supplementary Note 1

An estimation apparatus comprising:
at least one memory configured to store instructions; and
at least one processor configured to execute the instructions to:

acquire performance information corresponding to performance of light from nodes configuring an optical network; and
compare the acquired performance information to be an estimation target with performance information at normal time at which no anomaly occurs, and perform at least one of estimation of anomaly occurrence and identification of an anomaly occurring node.

Supplementary Note 2

The estimation apparatus according to Supplementary Note 1, wherein the at least one processor is configured to execute the instructions to
compare the acquired performance information to be an estimation target with the performance information at the normal time by using a model learned based on the performance information at the normal time.

Supplementary Note 3

The estimation apparatus according to Supplementary Note 1, wherein the at least one processor is configured to execute the instructions to
compare performance information related to a communication path to be an estimation target among the acquired performance information with performance information corresponding to the communication path at the normal time.

Supplementary Note 4

The estimation apparatus according to Supplementary Note 1, wherein the at least one processor is configured to execute the instructions to:
acquire an alert issued based on signal information corresponding to amplitude and phase difference of light from an optical communication receiver serving as a receiving end among the nodes configuring the optical network;
identify performance information to be a learning target in response to the acquired alert; and
perform the comparison based on the identified performance information, and identify the anomaly occurring node.

Supplementary Note 5

The estimation apparatus according to Supplementary Note 4, wherein the at least one processor is configured to execute the instructions to:
perform learning based on the identified performance information; and
compare the acquired performance information to be an estimation target with the performance information at the normal time by using a learned model.

Supplementary Note 6

The estimation apparatus according to Supplementary Note 4, wherein the at least one processor is configured to execute the instructions to
acquire an alert indicating that anomaly occurrence is estimated based on the signal information from the optical communication receiver.

Supplementary Note 7

The estimation apparatus according to Supplementary Note 4, wherein the at least one processor is configured to execute the instructions to
acquire an alert indicating that anomaly occurrence is estimated in accordance with a quality value estimated based on the signal information.

Supplementary Note 8

The estimation apparatus according to Supplementary Note 1, wherein
the performance information includes at least one of information corresponding to intensity of light and information corresponding to a state of data to be transmitted.

Supplementary Note 9

An estimation method executed by an information processing apparatus, the estimation method comprising:
acquiring performance information corresponding to performance of light from nodes configuring an optical network; and
comparing the acquired performance information to be an estimation target with performance information at normal time at which no anomaly occurs, and performing at least one of estimation of anomaly occurrence and identification of an anomaly occurring node.

Supplementary Note 10

A non-transitory computer-readable recording medium having a program recorded thereon, the program comprising instructions for causing an information processing apparatus to:
acquire performance information corresponding to performance of light from nodes configuring an optical network; and
compare the acquired performance information to be an estimation target with performance information at normal time at which no anomaly occurs, and perform at least one of estimation of anomaly occurrence and identification of an anomaly occurring node.
The program described in the example embodiments and supplementary notes is stored in a storage device, or recorded on a computer-readable recording medium. For example, the recording medium is a portable medium such as a flexible disk, an optical disk, a magneto-optical disk, and a semiconductor memory.
Although the present invention has been described above with reference to the example embodiments, the present invention is not limited to the example embodiments described above. The configurations and details of the present invention can be changed in various manners that can be understood by one skilled in the art within the scope of the present invention.

DESCRIPTION OF REFERENCE NUMERALS 100 communication system
200 optical network
210 optical communication receiver
220 other devices
230 optical communication receiver
231 signal information acquiring unit 232 model learning unit
233 communication quality estimating unit
234 determining unit
235 alerting unit
300 management apparatus
310 operation input unit
320 screen display unit
330 communication I/F unit
340 storing unit
341 path device correspondence information
342 device performance information
343 model information
344 program
350 operation processing unit
351 data acquiring unit
352 learning unit
353 estimating unit
354 output unit
400 performance information collection apparatus
500 management apparatus
551 alert accepting unit
552 identifying unit
553 learning unit
554 estimating unit
555 output unit
600 estimation apparatus
601 CPU
602 ROM
603 RAM
604 programs
605 storage device
606 drive device
607 communication interface
608 input/output interface
609 bus
610 storage medium
611 communication network
621 acquiring unit
622 estimating unit

The invention claimed is:

1. An estimation apparatus comprising:
at least one memory configured to store instructions; and
at least one processor configured to execute the instructions to:
acquire performance information corresponding to performance of light from nodes configuring an optical network;
compare the acquired performance information to be an estimation target with performance information at normal time at which no anomaly occurs, and perform at least one of estimation of anomaly occurrence and identification of an anomaly occurring node;
acquire an alert issued based on signal information corresponding to amplitude and phase difference of light from an optical communication receiver serving as a receiving end among the nodes configuring the optical network;
identify performance information to be a learning target in response to the acquired alert; and
perform the comparison based on the identified performance information, and identify the anomaly occurring node.

2. The estimation apparatus according to claim 1, wherein the at least one processor is configured to execute the instructions to
compare the acquired performance information to be an estimation target with the performance information at the normal time by using a model learned based on the performance information at the normal time.

3. The estimation apparatus according to claim 1, wherein the at least one processor is configured to execute the instructions to compare performance information related to a communication path to be an estimation target among the acquired performance information with performance information corresponding to the communication path at the normal time.

4. The estimation apparatus according to claim 1, wherein the at least one processor is configured to execute the instructions to:

perform learning based on the identified performance information; and compare the acquired performance information to be an estimation target with the performance information at the normal time by using a learned model.

5. The estimation apparatus according to claim 1, wherein the at least one processor is configured to execute the instructions to acquire an alert indicating that anomaly occurrence is estimated based on the signal information from the optical communication receiver.

6. The estimation apparatus according to claim 1, wherein the at least one processor is configured to execute the instructions to acquire an alert indicating that anomaly occurrence is estimated in accordance with a quality value estimated based on the signal information.

7. The estimation apparatus according to claim 1, wherein the performance information includes at least one of information corresponding to intensity of light and information corresponding to a state of data to be transmitted.

8. An estimation method executed by an information processing apparatus, the estimation method comprising:

acquiring performance information corresponding to performance of light from nodes configuring an optical network;

comparing the acquired performance information to be an estimation target with performance information at normal time at which no anomaly occurs, and performing at least one of estimation of anomaly occurrence and identification of an anomaly occurring node;

acquiring an alert issued based on signal information corresponding to amplitude and phase difference of light from an optical communication receiver serving as a receiving end among the nodes configuring the optical network;

identifying performance information to be a learning target in response to the acquired alert; and performing the comparison based on the identified performance information, and identify the anomaly occurring node.

9. A non-transitory computer-readable recording medium stores a program recorded thereon, the program comprising instructions for when that executed by an information processing apparatus causes the information processing apparatus to:

acquire performance information corresponding to performance of light from nodes configuring an optical network;

compare the acquired performance information to be an estimation target with performance information at normal time at which no anomaly occurs, and perform at least one of estimation of anomaly occurrence and identification of an anomaly occurring node;

acquire an alert issued based on signal information corresponding to amplitude and phase difference of light from an optical communication receiver serving as a receiving end among the nodes configuring the optical network;

identify performance information to be a learning target in response to the acquired alert; and perform the comparison based on the identified performance information, and identify the anomaly occurring node.

* * * * *